US006143119A

United States Patent [19]

Seidner

[11] Patent Number: 6,143,119

[45] **Date of Patent: *Nov. 7, 2000**

[54] COMPOSITE MOULDING AND METHOD OF MAKING

[76] Inventor: Marc A. Seidner, 234 Conway Ave., Los Angeles, Calif. 90024

[ * ] Notice: This patent is subject to a terminal disclaimer.

[21] Appl. No.: 08/831,780

[22] Filed: Apr. 9, 1997

[51] Int. Cl.$^7$ .............................. B32B 31/00; B27D 1/00

[52] U.S. Cl. .......................... 156/257; 144/346; 144/350; 144/355; 156/259; 156/267; 156/268; 156/293; 156/298; 156/299; 156/300

[58] Field of Search .................................... 156/257, 259, 156/267, 268, 293, 298, 299, 300; 144/346, 350, 355

[56] References Cited

U.S. PATENT DOCUMENTS

| | | | |
|---|---|---|---|
| 3,476,630 | 11/1969 | Viol et al. | 156/268 |
| 3,477,485 | 11/1969 | Talbott | 156/268 |
| 4,111,247 | 9/1978 | Hasenwinkle | 144/316 |
| 4,619,800 | 10/1986 | Santo | 156/268 |
| 4,687,529 | 8/1987 | Wang | 156/163 |
| 5,546,715 | 8/1996 | Edstrom | 52/215 |
| 5,665,190 | 9/1997 | Sansano Sanz | 156/154 |
| 5,935,368 | 8/1999 | Tingley | 156/267 |
| 5,944,928 | 8/1999 | Seidner | 156/160 |

OTHER PUBLICATIONS

Wood, Better Homes & Gardens, Jan. 1991, Issue No. 40, pp. 38–41 (Publisher William Reed).

"Working in Wood, " Library in Congress, Card 80–81148, ISBN 0–399–12550–7, pp. 238–239.

*Primary Examiner*—Peter O'Sullivan
*Attorney, Agent, or Firm*—Pretty & Schroeder

[57] ABSTRACT

A method of making composite strips for mouldings, frames and the like, including the steps of providing a first elongate panel of a first material and a second elongate panel of a second material, laminating the first and second panels onto one another to provide a laminated panel, making a plurality of parallel cuts or slots in the second panel, adhering a filler strip to the first and second panels in each of the cuts, and gang sawing the laminated panel into composite strips by cutting the laminated panel at each of the filler strips. The filler strips may be formed as single pieces and may be formed as a pair of pieces not joined together. A composite panel having first and second elongate panels of different materials laminated together, with a plurality of parallel cuts in the second panel, and with filler strips in the cuts and adhered to the first and second panels. Several alternative embodiments are also disclosed.

33 Claims, 6 Drawing Sheets

FIG. 1
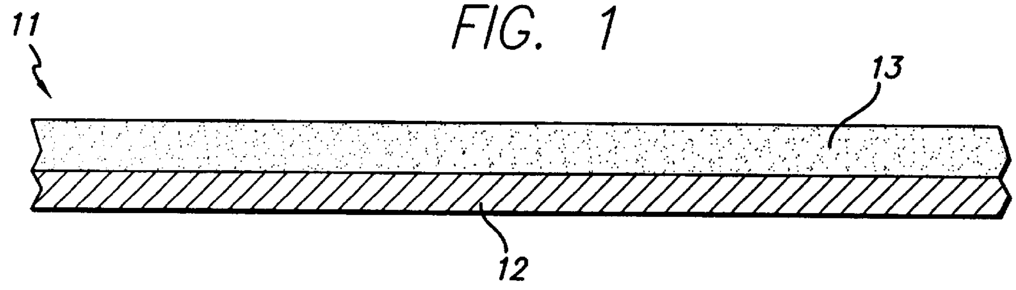
FIG. 2
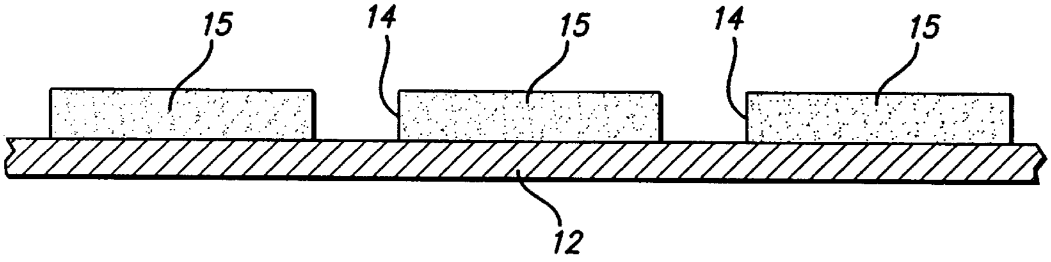
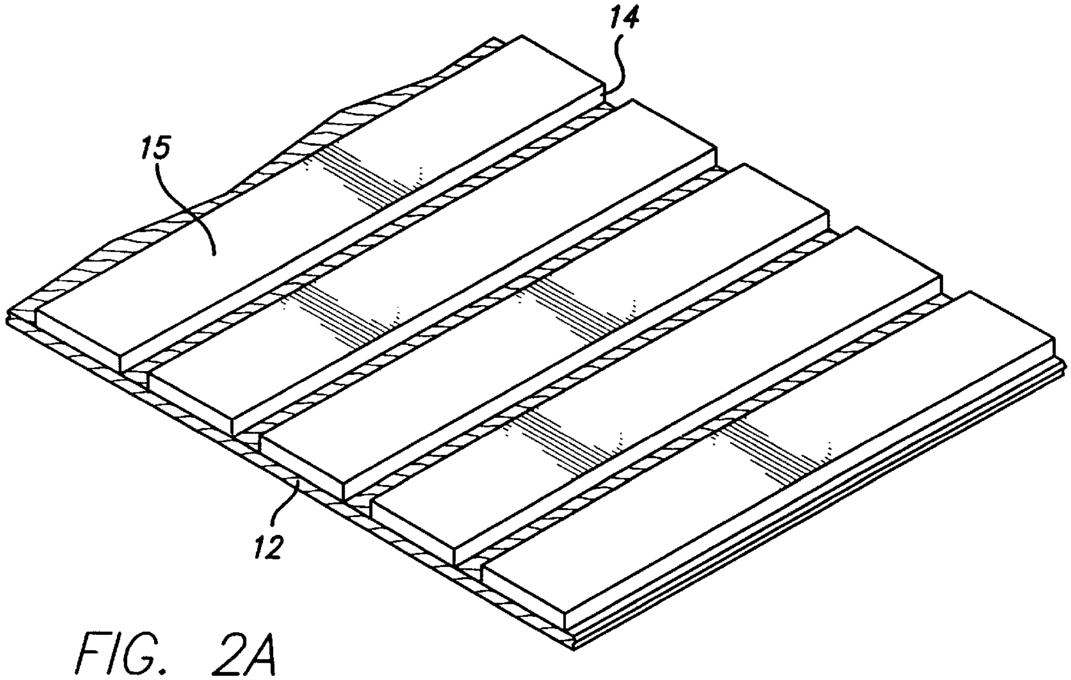
FIG. 2A

FIG. 4A
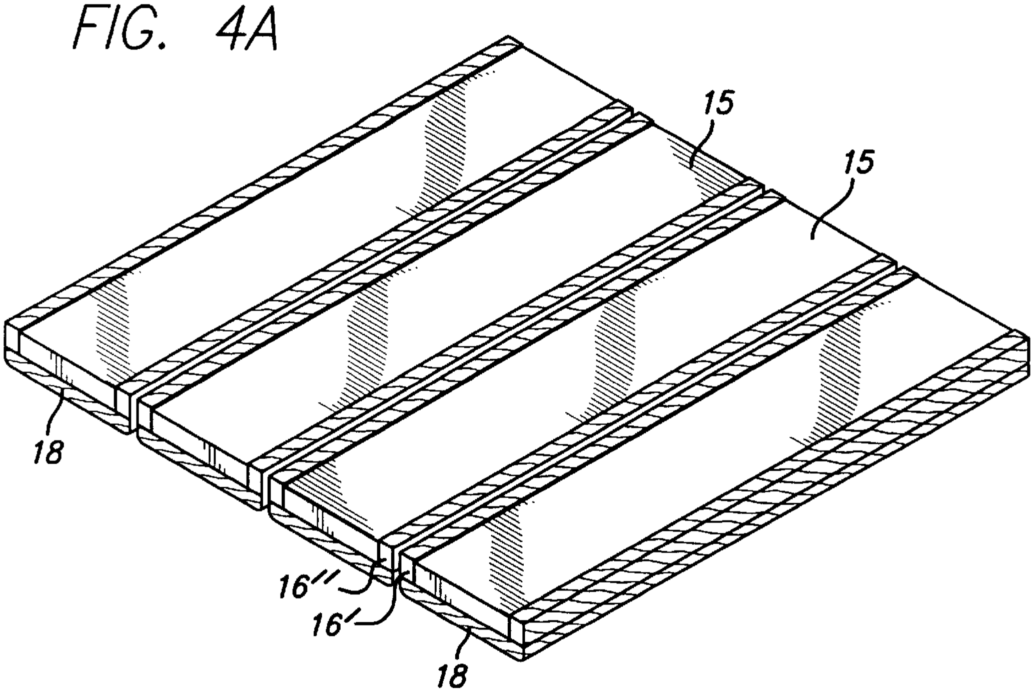
FIG. 5
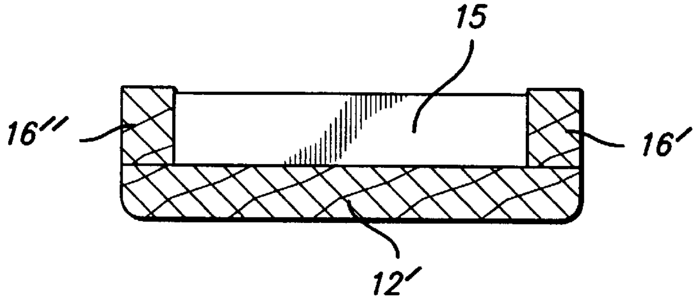
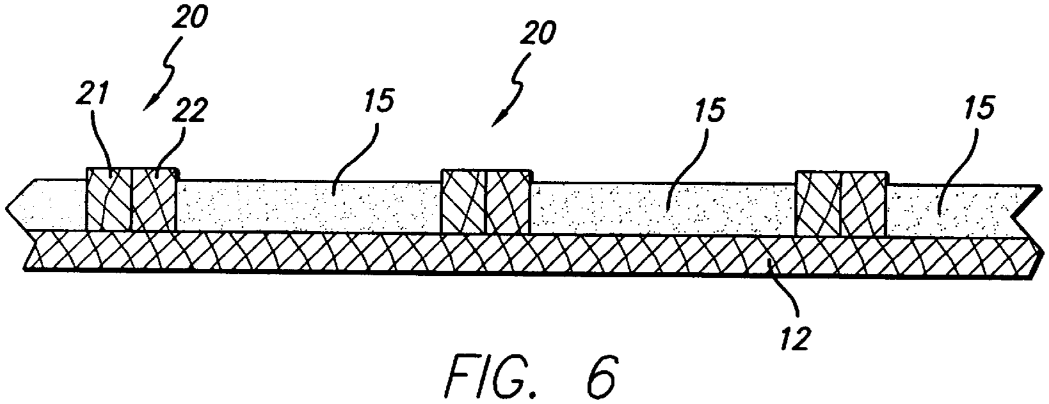
FIG. 6

FIG. 11
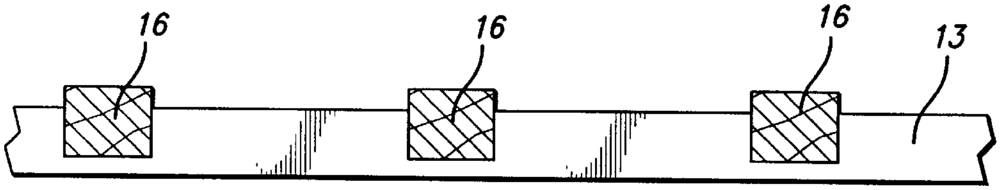
FIG. 12
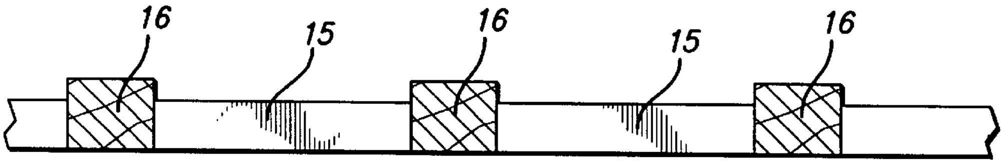
FIG. 13
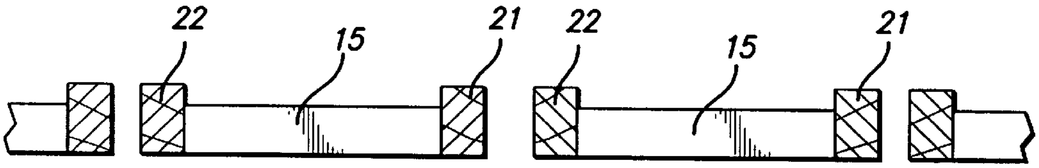
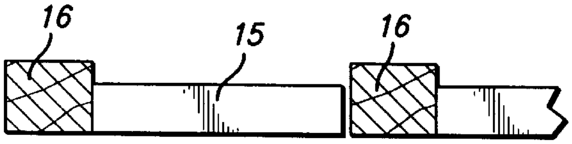
FIG. 13A
FIG. 13B
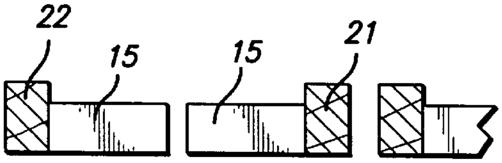
FIG. 14
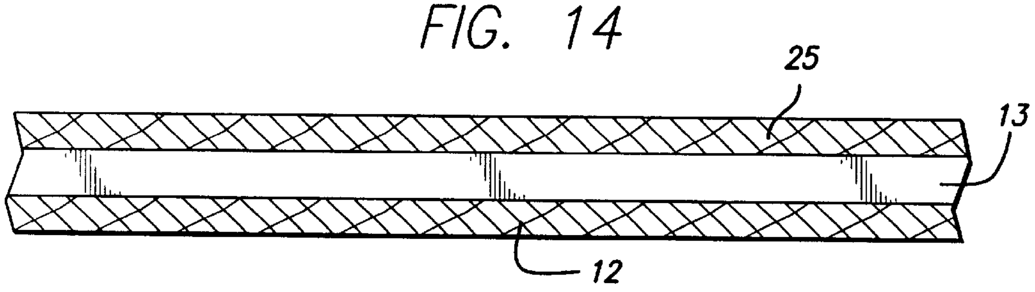

COMPOSITE MOULDING AND METHOD OF MAKING

BACKGROUND OF THE INVENTION

This invention relates to composite strips for mouldings, frames and the like, and to a method of making such composite strips.

Strips are widely used for mouldings, frames, shelving, door jambs, window sills, drawers, cabinets, doors, furniture components, flooring, and other structural and decorative products. The term "mouldings, frames and the like" as used herein is intended to cover all such products. Often it is desired that the strip have quality finish on one or more surfaces, which may be obtained by using a quality wood, veneer, plastic, aluminum or other material as desired. Usually, this quality material is relatively expensive. At the same time, the entire strip need not be made of a quality material, and a lower cost material such as particle board and similar composite products may be utilized as a portion of the strip, typically for a core as contrasted to a visually exposed portion. Also, sometimes it is desirable to provide a stronger core material as a reinforcement for a weaker quality visually exposed material, or vice-versa.

Customarily, several strips are milled from single rectangular pieces cut from a composite panel or finger jointed blank or a solid wood board or plank. Additionally, two or more discrete strip pieces may be individually glued together to form a single strip. This glueing process is slow, costly and labor intensive.

Accordingly, it is an object of the present invention to provide a new and improved composite strip which is satisfactory for use in place of the conventional strip, while at the same time utilizing less expensive material and also being producible at relatively high production rates and relatively low cost. An additional object is to provide a plurality of such strips as a series of connected strips in a new composite panel form or as individual strips which can be flat or machined to various profiles and contours as desired. Another object is to provide glued composite strips where a core component of lesser cost and/or quality can be concealed from view by a higher quality and/or more expensive component at selected surfaces as desired for the end use of the strip. Other objects, advantages, features and results will more fully appear in the course of the following description.

SUMMARY OF THE INVENTION

One embodiment of the method of the invention for making composite strips for mouldings, frames and the like, includes the steps of providing a first elongate panel of a first material and a second elongate panel of a second material, laminating the first and second panels onto one another to provide a laminated panel, making a plurality of parallel cuts in the second panel, at least part way through the second panel, adhering a filler strip to at least one of the panels in each of the cuts, and gang sawing the laminated panel into composite strips by cutting the laminated panel as desired or needed, usually at each of the filler strips. The filler strips may be formed as a single piece and may be formed as a pair of pieces not joined together. The method may include the step of machining the first material and the filler strip to a desired contour or just machining the first material itself prior to the gang sawing or during the gang sawing step or after the gang sawing step.

In an alternative embodiment of the method, the step of removing the first panel by machining, such as sanding or milling or peeling, may be substituted for the step of sawing to separate the laminated panel into individual composite strips.

In an alternative embodiment, the laminated panel may be made of first, second and third elongate panels. In another embodiment, only a single elongate panel need be used. Also, the first panel may be a relatively thick panel of wood or veneer or the like, or may be a relatively thin panel of plastic, aluminum, paper or paint.

The invention also includes a composite panel having first and second elongate panels of different materials laminated together, with a plurality of parallel cuts in the second panel, and filler strips in the cuts adhered to at least one of the first and second panels. The individual discrete filler strips may be single longitudinal pieces or may be pairs of pieces not adhered together. Alternatively, the composite panel may be of three elongate panels, or of a single elongate panel. The filler strips may also be composed of an extruded or injected liquid adhesive and thicker edge filler liquid of plastic, wood putty, epoxy, cementatious wood and gypsum mix, wood flour, or the like, which hardens, bonds and fills the groove between the core strips. The solid filler strips may be of a cross sectional dimension that results in their exposed horizontal surfaces ending at the same, lower or higher plane than the horizontal surface plane of the elongate panel after insertion into the groove of the panel.

BRIEF DESCRIPTION OF THE DRAWINGS

FIG. 1 is a sectional view of a laminated panel illustrating a step in the method of the invention;

FIG. 2 is a sectional view similar to that of FIG. 1 illustrating the parallel cut step of the invention;

FIG. 2A is a perspective view corresponding to that of FIG. 2;

FIG. 4A is a perspective view similar to that of FIG. 3A, showing the strips of FIG. 4;

FIG. 5 is a sectional view of a strip with one surface machined to a desired contour or profile;

FIG. 6 is a view similar to that of FIG. 3 showing an alternative embodiment of the invention;

FIG. 11 is a view similar to that of FIG. 10 illustrating the step of adhering strips into the cuts;

FIG. 12 is a view similar to that of FIG. 11 showing removal of a portion of the panels;

FIG. 13 is a view similar to that of FIG. 12 illustrating the strips following the gang sawing steps;

FIG. 13A and 13B are views similar to that of FIG. 13, showing alternative forms of the strips;

FIG. 14 is a view similar to that of FIG. 1 showing another alternative embodiment of the invention;

DESCRIPTION OF THE PREFERRED EMBODIMENTS

Figure 3:
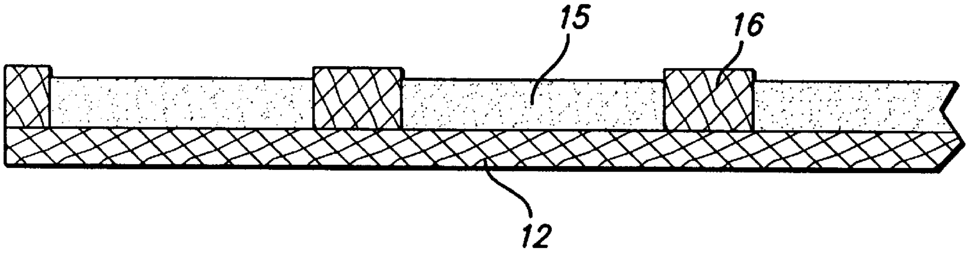
FIG. 3 is a sectional view similar to that of FIG. 2 illustrating the step of adhering strips into the cuts of FIG. 2.
Figure 3A:
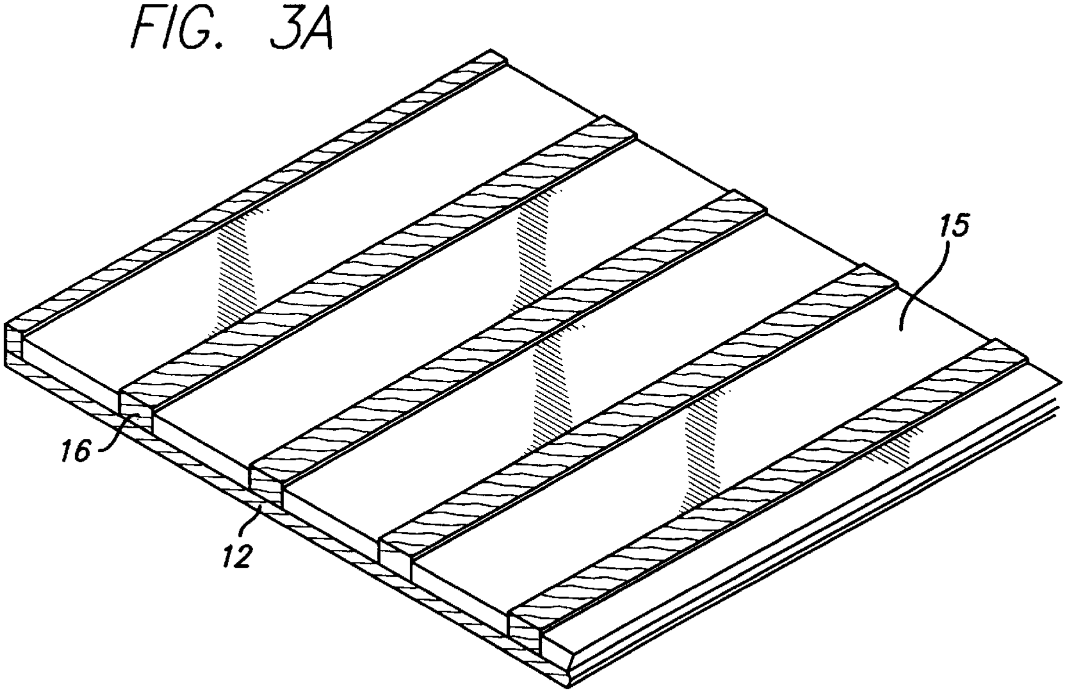
FIG. 3A is a perspective view similar to that of FIG. 2A and corresponding to FIG. 3.

A laminated panel 11 is formed by adhering a first component panel 12 to a second component panel 13. Typically, the first panel 12 is made of a quality wood or veneer and the second panel 13 is made of a less expensive particle board or the like. The invention is not limited to these specific materials, but panels of various materials may be utilized as desired, including plywood, laminated veneer lumber (LVL), oriented strand board (OSB), medium density fibreboard (MDF), hard board cement board, various plastics, aluminum, fiberglass, and stone. Also each of the panels may be solid or laminated or honeycomb or corrugated or otherwise, as desired.

A plurality of parallel cuts or ploughs 14 are made through the second panel 13, leaving a plurality of parallel islands 15 of the second panel 13.

Filler strips 16, typically of material similar to that of the panel 12, are placed in the cuts 14 and adhered in position by an adhesive. The filler strips should be adhered to at least one of the panels, and in some embodiment, to both panels. Preferably, the strips 16 are flush with the surfaces of the islands 15. However, if desired, they may project above the islands as seen in FIG. 3. In the embodiment illustrated in FIG. 3, each filler strip is a single piece of material.

Figure 4:
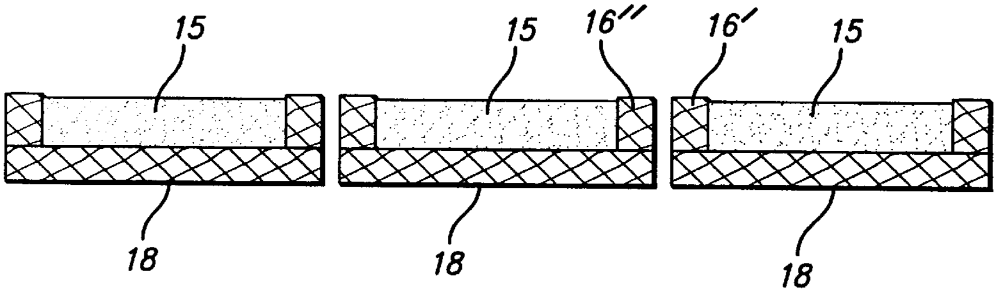
FIG. 4 is a sectional view similar to that of FIG. 3 illustrating the strips following the gang sawing step.

The next step in the method is gang sawing or ripping the laminated panel into composite strips by sawing through the panel 12 and through the filler strips 16, producing the composite strips 18, as shown in FIG. 4.

An enlarged view of one of the composite strips 18 is shown in FIG. 5. The structure comprises a core 15 corresponding to one of the islands 15 of FIGS. 2 and 2A, with sides 16' and 16" which result from the sawing of the filler strips 16, and a face layer 12' sawn from the panel 12.

If desired, the face 12' can be machined to a contour such as is shown in FIG. 5. The contour can be machined in the panel 12 of the laminated panel while the laminated panel is in the form of FIG. 3. Alternatively, the contour can be machined in the panel 12 at the time of sawing. As another alternative, the contour can be machined after the laminated panel has been sawn into the composite strips.

Figure 7:
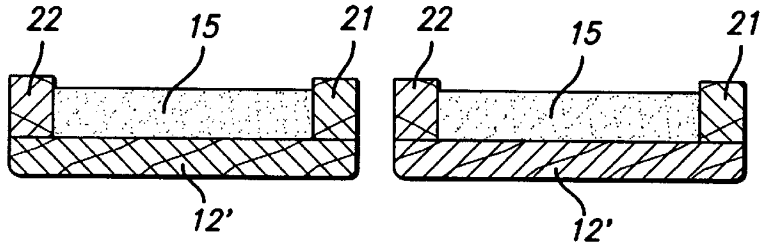
FIG. 7 is a sectional view showing the finished strips from the panel of FIG. 6, following the sawing step.

An alternative embodiment of the invention is shown in FIGS. 6 and 7. In this embodiment, filler strips 20 are utilized in place of the filler strips 16. Each filler strip 20 is formed in two pieces 21, 22 which pieces are not adhered to each other. The filler strip 20 is inserted into the cut in the same manner as is the filler strip 16, being adhered to the surface of the panel 12 and to the edges of the islands 15 of the panel 13. The cuts 14 may extend into the panel 12 if desired. Then the filler strips will be adhered into the panel 12 as well as at the surface.

Then the laminated panel with the filler strips is sawn into the finished composite strips by cutting through the panel 12, without requiring cutting through the filler strips 20. This method is used when it is desired to have the exposed surfaces of the filler strips of a desired finish which can be provided on the filler strips 21, 22 prior to insertion into the cuts in the laminated panel. By limiting the depth of the saw cuts to the thickness of the panel 12, the inner surfaces of the filler strips are not exposed to the saw blades, and subsequent finishing is not required.

Figure 8:
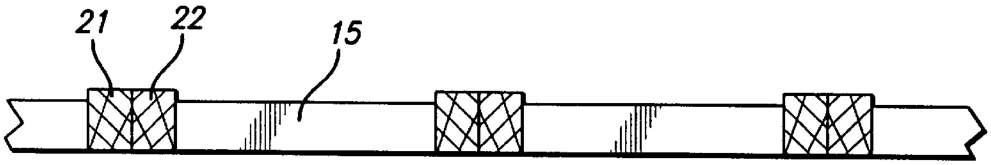
FIG. 8 is view similar to that of FIG. 3 showing an alternative embodiment of the invention.

In another embodiment of the invention, the panel 12 can be removed by machining, thereby separating the composite strips without sawing. The machining step may be sanding or milling or planing or the like, as desired, to produce the panel as shown in FIG. 8. The composite strips are shown in cross-section in FIG. 9, with the island 15 and side pieces 21, 22.

In another variation, the filler strips 16 may be used in place of the filler strips 21, 22. Then the panel is gang sawed, after the panel 12 is removed, to provide the desired plurality of composite strips.

Figure 9:
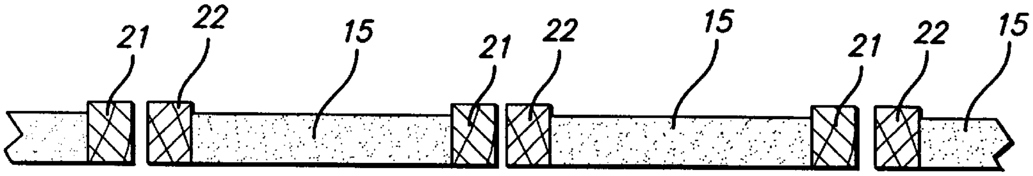
FIG. 9 is a view similar to that of FIG. 8 illustrating the strips following the gang sawing steps.
Figure 10:
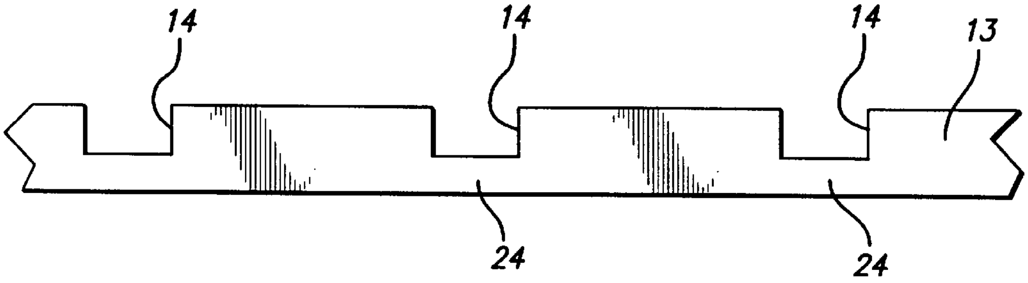
FIG. 10 is a view similar to that of FIG. 2 showing another alternative embodiment of the invention.

In another alternative embodiment, a peelable material can be utilized for the first panel 12. With this embodiment, the sawing step is omitted, with the first panel being peeled away leaving the finished composite strip as shown in FIGS. 8 and 9.

In another embodiment the first panel 12 may include the addition of a layer to the component panel which may be very thin, such as a thin plastic sheet, a layer of paper or a layer of paint. With this construction, the layer or panel 12 need not be removed as it will easily fracture or tear. This variation is suitable for use when it is desired to have the edges of the strip of a different surface texture or appearance, normally a more attractive material, while a paint or plastic layer on a face is acceptable.

In one embodiment of the invention the panels 12 and 13 and the filler strip 16 can be adhered using the same adhesive material. In an alternative embodiment, the panels can be adhered together with a first adhesive and the filler strips can be adhered to the edges of the second panel material with a second different adhesive.

By way of example, the first adhesive material can be a hot melt adhesive, which sets quickly and which at a later time can be softened by heating for ease of removal of the first panel from the combined second panel and filler strips. The second adhesive material can be an epoxy type adhesive which requires a longer time to cure completely; however, when once cured, will not soften when heated.

Another embodiment of the invention is shown in FIGS. 10–13. This embodiment may be utilized when the finished strips need the higher surface quality or appearance or different finish material only at the opposite edges of the strip or than is readily available by simply leaving the composite core edges of the islands exposed. The parallel cuts or plows 14 are made in the elongate panel 13, which typically may be thicker than the panel 13 in the earlier embodiment. No elongate panel 12 is utilized, and the cuts 14 do not go through the panel 13, leaving portions 24 at the bottom of each cut, typically about one sixteenth of an inch thick. See FIG. 10.

Next the filler strips 16 are positioned in the cuts 14 and adhered in place in the same manner as in the earlier embodiments. See FIG. 11. These strips may have the same height as the depth of the cut, or be lesser or greater, as desired.

In the next step, the material 24 of the panel 13 is removed by one of the machining methods, leaving the core pieces 15 joined by the filler strips 16, as shown in FIG. 12. Various present known machining methods may be used, including milling and sanding.

Next the composite panel is gang sawed, cutting through the filler strips 16 to leave the individual composite strips, as shown in FIG. 13, with the edges of the core pieces 15 covered by the portions 21, 22 of the filler strips, as shown in FIG. 13. Alternatively, when only one edge of the core piece is to be covered, the cuts may be at the junction of the core pieces 15 and filler pieces 16, as shown in FIG. 13A. In another alternative, cuts may be made through the filler pieces 16 and through the core pieces 15 as shown in FIG. 13B, providing strips 15', 22 and 15",21.

Another alternative embodiment of the invention is shown in FIGS. 14–17, where it is desired that the finished strips have the higher quality material on all four sides. A third elongate panel 25 is adhered to one surface of the elongate panel of the second elongate panel 13, with the first elongate panel 12 adhered to the opposite side of the panel 13, forming a laminated panel as shown in FIG. 14.

Figure 15:
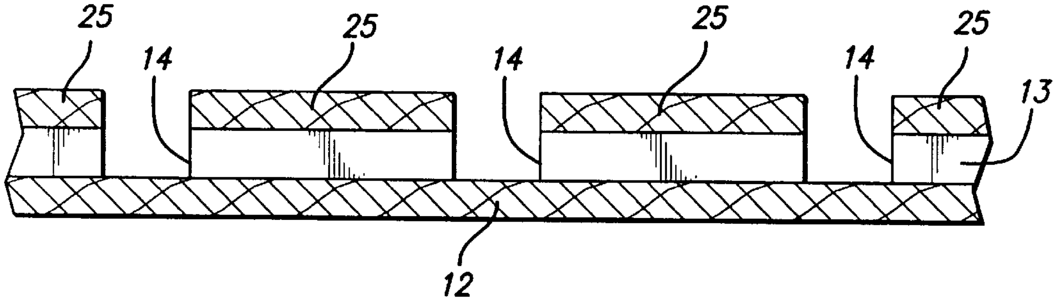
FIG. 15 is a view similar to that of FIG. 14 illustrating the parallel cut step.
Figure 16:
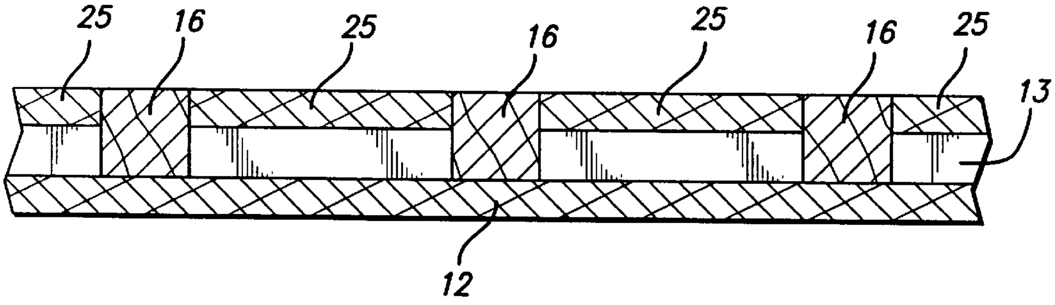
FIG. 16 is a view similar to that of FIG. 15 illustrating the step of adhering strips into the cuts.
Figure 17:
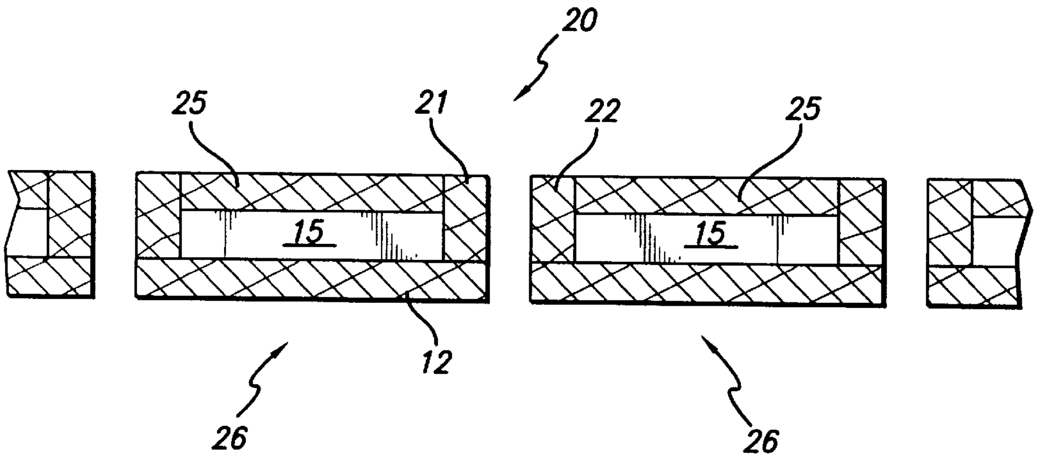
FIG. 17 is a view similar to that of FIG. 16 illustrating the strips following the gang sawing step.

Next the parallel cuts or plows 14 are made through the panel 25 and the panel 13, forming the product as shown in FIG. 15. Each of the filler strips may be a single piece such as the strip 16, or the filler strips 20 formed in two pieces 21, 22 may be used, to form the structure as shown in FIG. 16.

Finally, the composite panel is gang sawed at each of the filler strips to provide the plurality of composite strips 26, each having a core 15 of the layer 13 and having a covering on each surface from the materials of the layers 12 and 25 and of the filler strips 16 or 20.

I claim:

1. A method of making composite strips comprising the steps of:

providing a first component panel of a first material and a second component panel of a different second material;

laminating the first and second component panels onto one another to form a laminated panel;

after forming the laminated panel, making a plurality of parallel cuts in the second component panel at least part way through the second component panel to form plows therein;

adhering a filler strip to at least one of the component panels in each of the plows; and gang sawing the laminated panel along at least some of the filler strips to form a plurality of elongated composite strips.

2. The method as defined in claim 1 wherein the filler strips are formed as a pair of pieces not joined together.

3. The method as defined in claim 1 wherein in the filler strips are formed as single pieces, and the gang sawing step includes sawing through the filler strips.

4. The method as defined in claim 1 including the step of machining at least one of the first and second materials and at least a portion of the filler strip to a desired contour.

5. The method as defined in claim 4 wherein the machining step is performed prior to the gang sawing step.

6. The method as defined in claim 4 wherein the machining step is performed during the gang sawing step.

7. The method as defined in claim 4 wherein the machining step is performed after the gang sawing step.

8. The method as defined in claim 1 wherein the cuts are made through the second component panel in the step of making parallel plows.

9. The method as defined in claim 1 wherein the laminated panel is made by painting the first material onto the second material.

10. The method as defined in claim 1 further comprising:

providing a third elongate component panel;

laminating the first, second and third component panels onto one another with the second component panel between the first and third component panels; and making the parallel cuts through the second and third panels.

11. The method as defined in claim 1 further comprising the step of removing the first component panel prior to the step of gang sawing.

12. A method of making composite strips comprising the steps of:

providing a first component panel of a first material and a second component panel of a different second material;

laminating the first and second component panels onto one another to form a laminated panel;

after forming the laminated panel, making a plurality of parallel cuts in the second component panel to form plows therein;

adhering a filler strip to at least one of the first and second component panels in each of the plows;

removing the first component panel; and cuttng the filter strips to form a plurality of elongated composite strips.

13. The method as defined in claim 12 wherein the step of removing the first component panel is performed by machining.

14. The method as defined in claim 12 wherein the first component panel is peelable, and wherein the step of removing the first component panel is performed by peeling the first component panel from the second component panel and the filler strips.

15. The method as defined in claim 12 wherein the filler strips are formed as a pair of pieces not joined together.

16. The method as defined in claim 1 wherein said first and second component panels are laminated using a first adhesive and said filler strip is adhered using a second different adhesive having different softening characteristics, whereby the first adhesive can be softened for removal while the second adhesive is not so softened.

17. The method as defined in claim 16 wherein said first adhesive is a hot melt adhesive, and said first panel material is separated from said second panel material and filler strips by heating said first adhesive.

18. The method of claim 16 further comprising the step of selectively softening the first adhesive before removing the first component panel.

19. A method of making elongated composite strips suitable for use as mouldings or the like comprising the steps of:

providing a composite panel including a continuous component panel and a plurality of parallel islands adhered to the continuous component panel, the islands being made of a material different from that of the continuous component panel and being spaced apart from each other in a repeating pattern so as to define a plurality of parallel plows between the islands;

inserting filler strips in the plows, thereby forming a composite panel reflecting said repeating pattern, and the filler strips being made of a material different from that of the islands;

cutting the composite panel through the filler strips, thereby forming a plurality of composite strips each including one of the islands as a core and having sides formed by portions of the filler strips.

20. The method of claim 19 wherein each filler strip is flush with an exposed surface of the adjacent islands.

21. The method of claim 19 wherein each filler strip extends above the surface of the adjacent islands.

22. The method of claim 21 Further comprising contouring the composite panel.

23. The method of claim 19 wherein the composite panel is cut by gang sawing so as to form a plurality of similar composite strips simultaneously.

24. The method of claim 19 wherein the islands are made of particle board.

25. The method of claim 19 wherein the islands are made of oriented strand board.

26. The method of claim 19 wherein the islands are made of medium density fiberboard.

27. The method of claim 19 wherein the continuous panel and the filler strips are made of the same material.

28. The method of claim 19 wherein the continuous panel, the islands and the filler strips are all made of wood products, the continuous panel and the filler strips being made of a higher quality wood product as compared to the islands.

29. The method of claim 19 wherein the composite panel is cut at regularly spaced intervals such that each composite strip is of the same dimensions as other composite strips thus formed.

30. A method of making elongated composite strips suitable for use as mouldings or the like comprising:

providing a composite panel including a continuous component panel and a plurality of parallel islands adhered to the continuous component panel, the islands being made of a material different from that of the continuous component panel and being spaced apart from each other in a repeating pattern so as to define a plurality of parallel plows between the islands;

inserting filler strips in the plows to fill the plows, thereby forming a composite panel reflecting said repeating pattern, the filler strips being made of a material different from that of the islands;

removing the continuous panel; and cutting through the filler strips, thereby forming a plurality of composite strips each including one of the islands as a core and having sides formed by portions of the filler strips.

31. The method of claim 30 wherein the composite panel is cut at regularly spaced intervals such that each composite strip is of the same dimensions as other composite strips thus formed.

32. A method of making elongated composite strips suitable for use as mouldings or the like comprising:

providing a composite panel including a continuous component panel and a plurality of islands adhered to the continuous component panel, the islands being made of a material different from that of the continuous component panel and being spaced apart from each other in a repeating pattern so as to define a plurality of parallel plows between the islands;

inserting two filler strip pieces in each plow so that each piece is adjacent one of the islands, thereby forming a composite panel reflecting the repeating pattern, the filler strip pieces being made of a material different from that of the islands; and separating the composite panel between adjacent filter strip pieces, thereby forming a plurality of composite strips, each including one of the islands as a core and having sides formed by filler strip pieces.

33. The method of claim 32 wherein the composite panel is cut at regularly spaced intervals such that each composite strip is of the same dimensions as the other composite strips thus formed.

* * * * *